United States Patent Office 3,772,429
Patented Nov. 13, 1973

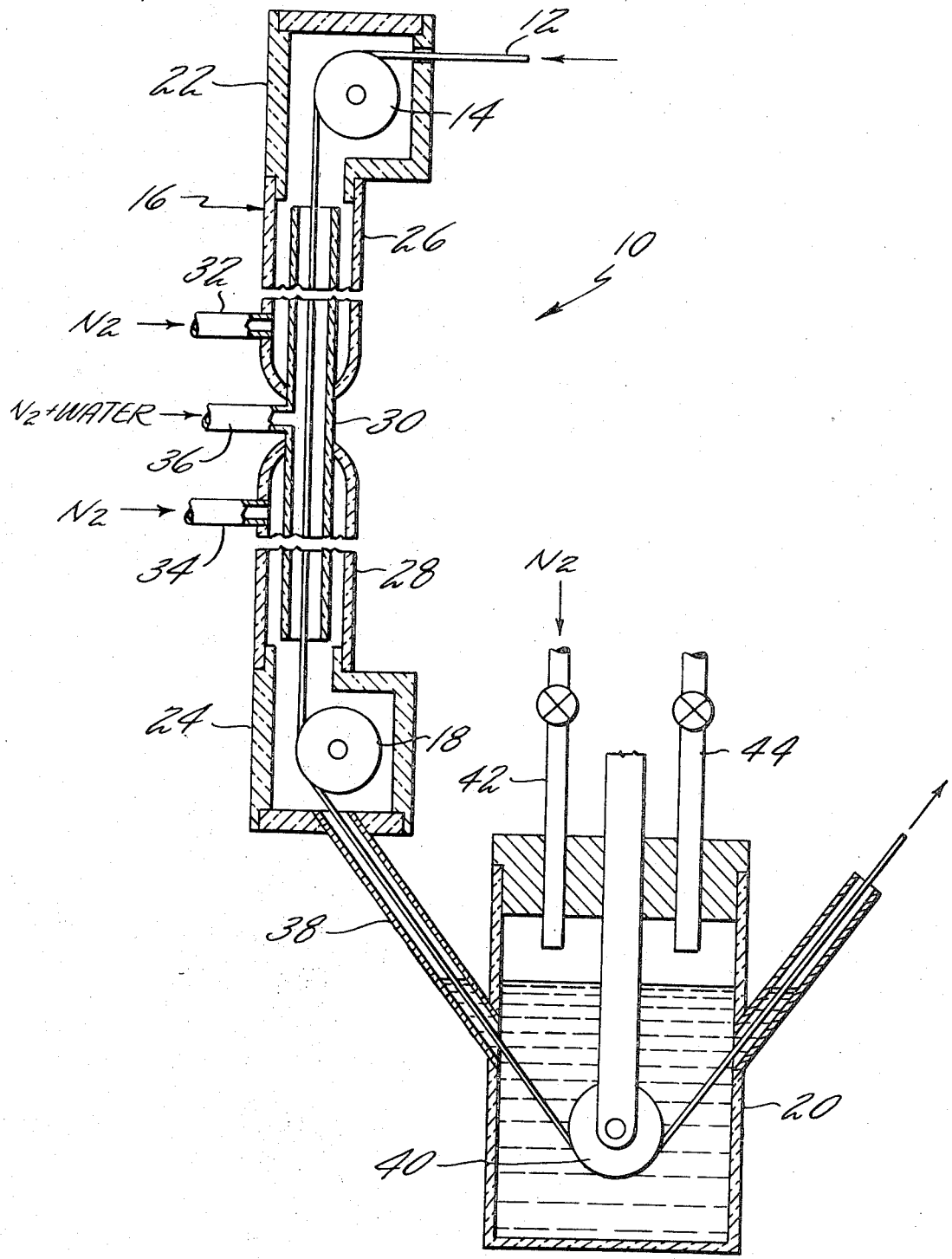

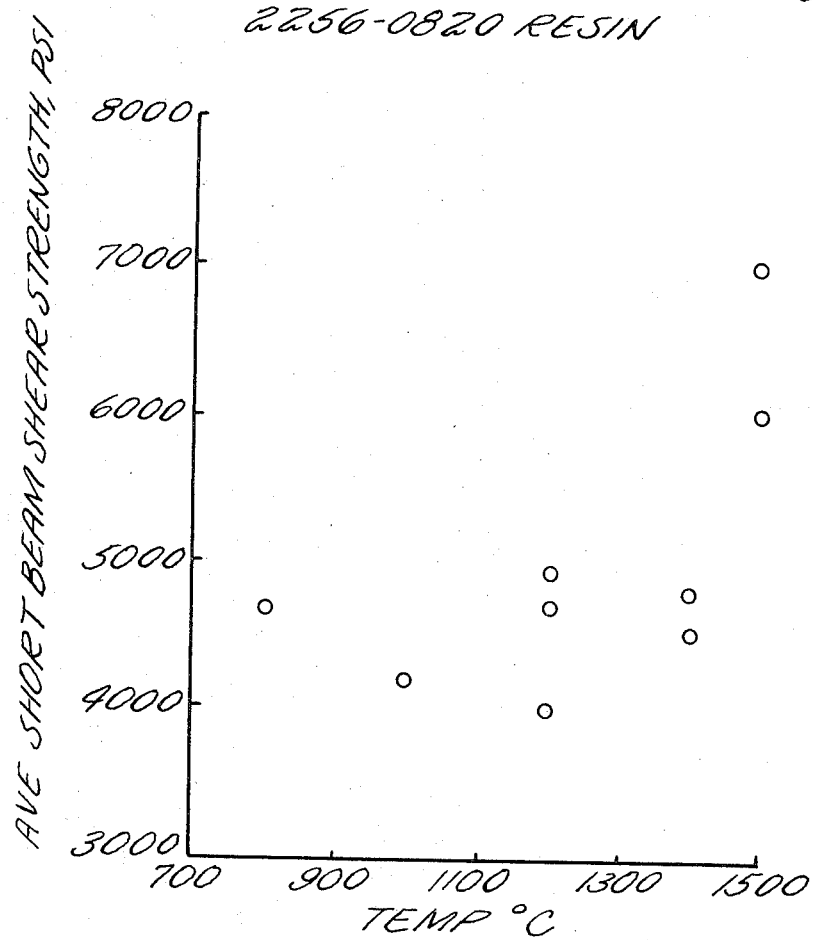

3,772,429
TREATMENT OF CARBON FIBERS
Malcolm Basche, West Hartford, and Daniel A. Scola, Glastonbury, Conn., assignors to United Aircraft Corporation, East Hartford, Conn.
Filed June 18, 1970, Ser. No. 47,491
Int. Cl. C01b 31/07
U.S. Cl. 423—447          3 Claims

ABSTRACT OF THE DISCLOSURE

A method of treating carbon fiber to improve its bonding characteristics in a resin matrix comprising heating the fiber to 1000°–1500° C. and exposing the heated fiber to a nitrogen atmosphere having a moisture concentration of 1–5 mol percent for a period of up to 28 seconds.

BACKGROUND OF THE INVENTION

This invention relates to carbon fibers of the type suitable for use as a reinforcement in a composite material and more particularly relates to a method of treating carbon fiber to improve its bond with the supporting matrix in a composite material.

High modulus high strength carbon and graphite yarns, having an ultimate tensile strength of at least $100 \times 10^3$ p.s.i. and a Young's modulus of at least $16 \times 10^6$ p.s.i., because of certain unfavorable surface characteristics, do not bond strongly to resins such as those suitable for use in applications of the aerospace industry, e.g. the epoxy or polyimide resins. The bond of such fibers to the resins has characteristically been poor, typically yielding graphite fiber-resin matrix composites with low shear strengths; generally in the range of 3500–4500 p.s.i. for low fiber content composites (20–45 vol. percent) and below 3500 p.s.i. for high fiber content composites (45–65 vol. percent).

While it has been suggested to surface treat carbon fibers in order to improve their shear strength by various methods, such as for example, oxidation, the resulting degradation of other fiber properties, especially tensile strength, has been a problem particularly when dealing with relatively high treatment temperatures of 1000° C. and higher.

SUMMARY OF THE INVENTION

The present invention relates to the high temperature treatment of carbon fiber in a continuous process wherein the surface of the fiber is activated at a rapid rate with minimum deterioration of the desirable filament properties. As used herein, the term carbon fiber relates to flexible carbon or graphite filamentary material available in any elongated textile form such as yarn, braids, felts, etc. or in monofilament form.

In accordance with this invention a resistively heated carbon fiber is exposed, at high temperature, to an atmosphere of nitrogen and water for less than 30 seconds. Experiments have shown that in order to treat a fiber at temperatures of 1000°–1500° C. and achieve a surface which will provide a strong bond to resin, without degrading the fiber, the nitrogen atmosphere must have a moisture concentration in the range of 1–5 mol percent with a reactor residence time of up to 28 seconds.

Carbon-resin composites fabricated with carbon fibers treated according to the present invention exhibited a high resistance to shear failure while maintaining high flexural strengths.

BRIEF DESCRIPTION OF THE DRAWINGS

An understanding of the invention will become more apparent to those skilled in the art by reference to the following detailed description when viewed in light of the accompanying drawings, wherein:

FIG. 1 illustrates the apparatus used in the practice of the fiber treatment process; and FIG. 2 is a graph illustrating the effect of temperature on shear strength.

DESCRIPTION OF THE PREFERRED EMBODIMENT

The technique of treating carbon fibers according to the present invention comprises heating carbon fibers in a nitrogen atmosphere having a limited moisture concentration at such a temperature and for a limited period of time such as to activate the fiber surface with little or no concomitant degradation in fiber properties. The treatment apparently increases the specific surface area of the fiber.

The heat treatment takes place in a nitrogen atmosphere having a moisture concentration of 1 to 5 mol percent at rather high temperatures, from 1000° to 1500° C., and for contact periods ranging from 0.1 to 28 seconds, inclusive. A residence time of greater than 28 seconds will result in fiber degradation. Exceptional results obtain when the temperature is maintained at 1400°–1500° C.

In the process, the apparatus designated generally as 10 in FIG. 1 was utilized. A continuous length of carbon fiber 12, emanating from a suitable supply roll (not shown) was passed over a first graphite guide roll 14, downwardly through a vertical double wall Pyrex reactor 16, past a second graphite guide roll 18 and into a resin-containing pot 20. As will be appreciated by those skilled in the art, the first and second guide rolls 16 and 18 are located within upper and lower graphite housing electrodes 22 and 24 respectively so as to cause resistance heating to the fiber segment therebetween. As shown, the electrodes 22 and 24 are in sealing engagement with the upper and lower ends of outer reactor tubes 26 and 28 respectively which surround inner reactor tube 30. The outer tubes 26 and 28 are each provided with a nitrogen inlet 32, 34 while the inner tube 30 is provided with a single centrally located inlet 36 for the ingress of a moisture containing nitrogen gas, with the moisture preferably being introduced by bubbling nitrogen gas through water at temperatures of 0°–25° C.

In practice, the yarn was coated immediately after treatment by passage through a resin solution in an atmosphere of nitrogen. An isolating tube 38 extends between the lower electrode 24 and the resin pot 20 in order to prevent exposure of the treated fiber to the air prior to resin coating. The resin pot is provided with a Teflon coated guide pulley 40, a nitrogen purge tube 42 and a resin fill tube 44.

After passage through the resin pot 20, the resin coated yarn is wound onto a take-up drum (not shown) preferably in tape form. The resin impregnated tapes can then be "B" staged in the conventional manner, cut up into appropriate size and laid up into a multilayered composite to give a desired orientation, for example, 0°; 0°, 90°, or 0°, 90°, 45° fiber orientation. The composite is then cured. For epoxy matrix composites, a satisfactory cure cycle comprises heating at 80° C. for 50 minutes or until gelation occurs at contact pressure, followed by curing for 2 hours at 100° C. at 100–200 p.s.i. with post curing for 2 hours at 150° C. in an air circulating oven. Alternatively, it may include first using contact pressure at 80° C. until gelation, pressing to a constant volume and curing for 2 hours at 100° C. in the press, then post curing for 2 hours at 150° C. in an air circulating oven. Polyimide matrix composites can be satisfactorily treated by partial cure of the resin impregnated yarn in a vacuum, followed by initial molding at 200 to 1000 p.s.i. at 500°

F., continued molding at 2500 to 3500 p.s.i. at 680° F., followed by post cure in the mold at 600° F. for 24 hours in an inert atmosphere.

During experimentation, apparatus such as that shown in FIG. 1 was utilized. The reactor measured 12 to 24 inches between electrodes and incorporated an inner tube 30 of ⅜ inch diameter and outer tubes 26 and 28 of ⅞ inch ID. Commercially available Thornel 50 yarn was passed through the reactor and into the pot 20 containing epoxy resin. A variety of temperatures, as shown in FIG. 2, were utilized. In Table I, the results of several tests are shown.

heated fiber to a nitrogen atmosphere for a period of from 0.1 to 28 seconds, inclusive, said nitrogen atmosphere having a moisture concentration in a range of 1–5 mol percent.

2. The method of claim 1 wherein the fiber is heated to a temperature range of 1400°–1500° C.

3. A method of treating carbon fiber to improve the bonding characteristics of the fiber to a resin matrix comprising heating the fiber to a temperature of 1500° C. and exposing the heated fiber to a nitrogen atmosphere containing 2.8 mole percent water for 28 seconds.

TABLE I.—GRAPHITE FIBER REINFORCED RESIN COMPOSITES

| Composite number | Yarn (size) | Treatment | Short beam shear strength p.s.i. (S/D=5/1) | Flexural properties | | Fiber content, v./o. | Density, g./cc. |
| --- | --- | --- | --- | --- | --- | --- | --- |
| | | | | Strength, $10^3$ p.s.i. | Modulus, $10^6$ p.s.i. | | |
| 1 | Thornel-50 (PVA) | None | 3,760 | 63.8 | 13.6 | 39 | 1.410 |
| 2 | do | do | 4,250 | 74.9 | 16.6 | 42 | 1.390 |
| 3 | do | do | 4,770 | 89.1 | 17.3 | 54 | 1.416 |
| 4 | do | $N_2$, 2.8 mol percent $H_2O$, 1,500° C. C. T. 28 sec | 7,100 | 81.4 | 15.0 | 37 | 1.39ʃ |
| 5 | do | do | 6,248 | 98.0 | 16.9 | 48 | 1.427 |

It will be noted that by the present method there is provided a continuous process for activating the graphite surface with little or no degradation of the fiber properties. It is seen for example, that the graphite-resin composites prepared thereby can achieve a significantly higher shear strength with no diminution of flexural strength as compared to similar composites made with untreated fibers.

Since flexural strengths are considered a valid indicator of fiber tensile properties, it will be appreciated that the increase in flexural strength indicates that there has been no lessening in the fiber tensile properties.

What has been set forth above is intended primarily as exemplary to enable those skilled in the art in the practice of the invention and it should therefore be understood that, within the scope of the appended claims, the invention may be practiced in other ways than as specifically described.

What is claimed is:

1. A method of treating carbon fiber to improve the bonding characteristics of the fiber to a resin matrix without causing significant degradation in mechanical properties of the fiber comprising heating the fiber to a temperature of 1000° to 1500° C., and exposing the

References Cited

UNITED STATES PATENTS

| | | | |
| --- | --- | --- | --- |
| 1,815,525 | 7/1931 | Power | 252—445 |
| 1,926,587 | 9/1933 | Hansgirg | 423—648 |
| 3,294,489 | 12/1966 | Millington et al. | 423—447 |
| 3,304,148 | 2/1967 | Gallagher | 423—447 X |
| 3,476,703 | 11/1969 | Wadsworth et al. | 260—37 |
| 3,053,775 | 9/1962 | Abbott | 23—209.2 |
| 3,337,301 | 8/1967 | McWhorter et al. | 23—209.1 |
| 2,062,370 | 12/1936 | Miller | 117—47 H |

FOREIGN PATENTS 7,719    1910    Great Britain

OTHER REFERENCES

Harris et al. "J. Material Science" vol. 4, 1969, pp. 432–438.

Sach et al., "Chemical Abstracts," vol. 71, 1969 103026 h.

EDWARD J. MEROS, Primary Examiner

U.S. Cl. X.R.

106—307; 117—47 R; 260—37; 423—460